Figure 1:
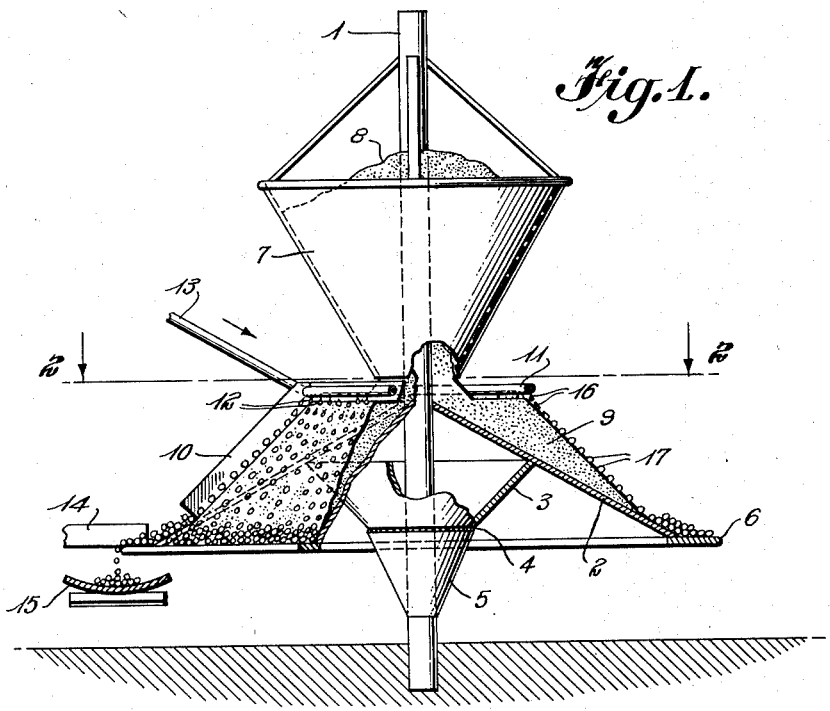

Feb. 3, 1953     B. J. KERLEY, JR     2,627,457
PELLETIZING PROCESS
Filed March 28, 1951

INVENTOR
Bernard J. Kerley, Jr.
BY Burns, Doane and Benedict
ATTORNEYS

UNITED STATES PATENT OFFICE 2,627,457

PELLETIZING PROCESS

Bernard J. Kerley, Jr., Pecos, Tex.

Application March 28, 1951, Serial No. 218,014

9 Claims. (Cl. 71—64)

This invention relates to a method for the production of pellets from finely divided solid materials. More particularly, the invention relates to a simple and economical method of producing pellets of uniform size and shape.

Prior art methods for the production of pellets from finely divided materials such as fertilizers entail the utilization of rotating drums. In these processes a quantity of powdered material is treated with a predetermined quantity of liquid to produce a wetted mass of the desired consistency. This wetted mass is reduced to pellets by the rolling action which occurs within the rotating drum. In these prior art processes the pellets which are formed are constantly agitated in contact with unpelleted material and are subjected repeatedly to the liquid medium which is being sprayed into the drum. As a consequence of these facts the pellets produced are non-uniform in character.

In recent years it has been recognized that the manufacture and marketing of fertilizers in pelleted form is advantageous. Among other things, it has been discovered that the heat developed in the manufacturing process is more readily dissipated when the fertilizer is produced in the form of pellets. Furthermore, pelleted fertilizers may be immediately packaged after manufacture without appreciable danger of agglomeration. In addition, dust and wind losses are reduced and simpler and more uniform distribution from fertilizer distributors may be effected when pelletized fertilizers are employed.

A primary object of the invention, therefore, is to provide a simple and economical method of producing pelleted fertilizers.

An additional primary object of the invention is to provide a method for the production of pellets of uniform size and composition from all types of finely divided solid materials.

It is a further object of the invention to provide a process for the production of pellets from finely divided solid materials in which the pellets are removed from the powdered material substantially immediately after formation.

It is an additional object of the invention to provide a process for the production of pellets from finely divided materials in which the pellets, after being formed, are not again subjected to the action of a liquid medium.

It is still a further object of the invention to provide an economical method for the production of pellets of finely divided materials which may be practiced through the utilization of a simple apparatus.

The process of the invention in its broadest aspects may be practiced by forming a bed or surface of finely divided solid material, causing a liquid capable of wetting said material to be deposited upon said surface to form an initial agglomerate, and causing said agglomerate to roll over at least a portion of said surface to form a pellet by accumulation of an additional quantity of said material.

In a preferred embodiment of the invention, an inclined surface of finely divided solid material is formed and a liquid capable of wetting the solid material is deposited in droplet form on an upper portion of such inclined surface to form an initial agglomerate which will roll downwardly over the surface and form a pellet by accumulation of an additional quantity of said material.

It is further preferred that the inclined surface of solid material have a slope requisite to cause the initial agglomerates formed to roll downwardly over the surface under the force of gravity. In some instances, however, it is beneficial to reduce the slope of the bed of finely divided solid material to such an extent that gravity alone is not sufficient to induce and maintain the passage of the initial agglomerate downwardly over the bed. In such instances, the initial agglomerates formed by impingement of the liquid droplets on the sloping bed of finely divided material may be caused to roll over the surface of the bed by movement of the bed itself or by depositing the liquid droplets onto the bed with a force adequate to cause the agglomerates initially formed to roll across the bed for an adequate distance to form pellets of the desired size.

A particularly appropriate method of practicing the invention entails forming a generally conical shaped rotatable bed of finely divided solid material, depositing a liquid capable of wetting said material on an upper portion of the conical bed to produce an initial agglomerate, and causing the initial agglomerate so produced to roll downwardly over the surface of the bed and form a pellet by accumulation of an additional quantity of finely divided solid material. When the slope of the conical bed is reduced to a point such that the force of gravity alone is not sufficient to maintain the initial agglomerates in motion, the conical bed may be rotated to produce centrifugal force which will supplement gravity, the combined forces acting to cause the agglomerates to pass over the surface of the bed of finely divided material.

It will be appreciated that as the slope of the bed of material is reduced, the speed of rotation of the bed may be increased, and that in the extreme case, centrifugal force may entirely supplant the force of gravity. In such an instance, the process would be carried out on an essentially flat surface and the centrifugal force produced by the rotation of the bed of material would cause the agglomerates to roll over the bed and form pellets.

A preferred form of apparatus for practicing the invention embraces a rotatable inclined surface, means for establishing and maintaining a bed of finely divided material such as fertilizer on said surface, means for depositing a liquid in droplet form on the upper portions of said bed, and means for removing the pellets produced from the lower portion of said bed. It will be appreciated, however, that the process of the invention may be practiced in a variety of other types of apparatus. For example, a moving belt may be loaded with powdered material and passed under a series of sprays which deposit droplets of liquid on the sloping sides of the bed of material carried by the belt.

The invention and the preferred form of apparatus for the practice thereof will be better understood by reference to the drawings, in which—

Figure 2:
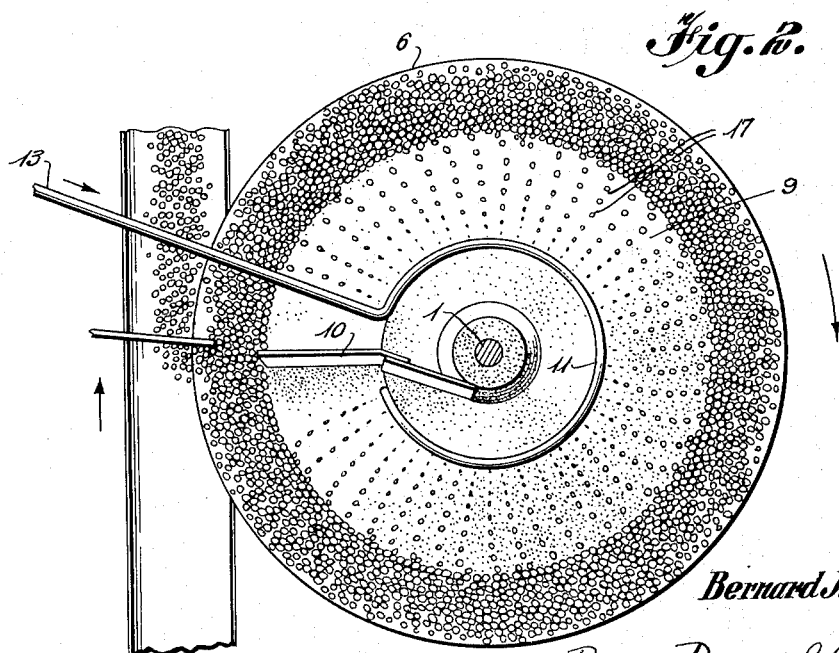

Figure 1 is a front elevational view, partly in section, of the preferred form of the apparatus; and Figure 2 is a cross-sectional view taken along the line 2—2 of Figure 1.

It will be observed that the apparatus as shown in the drawings includes a supporting shaft 1 on which is mounted an annular rotatable inclined plane 2. Inclined plane 2 is of circular cross section, as is more clearly shown in Figure 2. Inclined plane 2 is provided with supporting means 3 which engage ball bearings 4 carried by the annular member 5 secured to the shaft 1. Inclined plane 2 is also provided with pellet retaining means 6 at the base thereof.

A hopper 7 is secured to the shaft 1 at an appropriate distance above the plane 2 and is adapted to distribute and maintain pulverant material 8, such as fertilizer, in the form of a sloping bed 9 on the surface of the inclined plane 2. A scraper 10 is provided to implement the formation and maintenance of the bed 9.

An annular pipe 11 having a plurality of spaced openings 12 on the lower side thereof is disposed above the plane 2 and adapted to distribute liquid in droplet form on the bed 9. Pipe 11 is connected to a source of liquid (not shown) by pipe 13. There is also provided a pellet removing means 14, whereby the pellets produced from the process of the invention are removed from the retaining means 6. A belt-type conveying means 15 is provided for transporting the so removed pellets to storage, packaging or the like.

In operation, the inclined plane 2 is caused to rotate about the shaft 1 at a tangential speed of about 10 to 150" per minute. Finely divided solid material 8 is introduced from the hopper 7 onto the surface of the plane 2, where, through the cooperative action of the scraper 10 it is formed into the sloping bed 9. Appropriate liquid is then introduced through the pipe 13 into the annular pipe 11, and is deposited in droplets 16 of appropriate size from the openings 12 onto the bed 9. These liquid droplets form initial agglomerates or pellets shown generally at 17, which roll downwardly over the surface of the bed 9 and accumulate on the retaining means 6. The so-formed pellets are removed from the retaining means 6 by pellet removing means 14, and are thence conveyed to packaging or storage by the conveyor 15.

The size of the pellets which are produced by the method of this invention may be controlled by controlling the size of the liquid droplets which are deposited upon the bed of powdered material. For the purpose of this invention, as applied to fertilizers, it is preferred that the pellets produced have a diameter of from about 0.25 inch to about 0.10 inch. Those skilled in the art will readily be able to regulate the size of the droplets falling upon the bed of fertilizer material to produce pellets of appropriate size.

As previously mentioned the droplets of liquid are preferably deposited on a bed of powdered material having a slope such that the initial agglomerates formed will be caused to roll downwardly over the surface by the force of gravity. It is accordingly preferred that the angle of slope of the bed of powdered material approach the maximum angle of repose thereof. This maximum angle of repose is of course dependent upon the particular material comprising the sloping bed. Generally speaking, it may be stated that an angle of between about 30° and about 45° from the horizontal will suffice.

It will be appreciated that in the preferred embodiment of the invention in which a rotatable inclined surface of finely divided material is employed, the centrifugal force resulting from the rotation of the bed may advantageously be availed of although the bed itself is characterized by a slope sufficient to cause agglomerates to roll over the bed and form pellets by the force of gravity alone. When such a rotating inclined surface is employed it is preferred that the sloping bed be disposed at an angle of between about 30° and about 45° from the horizontal. With such a rotatable inclined bed, the tangential speed of the bottom of the sloping surface is preferably within the range of from about 10 to 150 inches per minute measured at the outer circumference of the bed of solid material. As the slope of the bed is lowered, the speed of rotation will of course be proportionately increased. Additionally it is preferred that the bed of powdered material be of sufficient length to permit the agglomerates formed by impingment of the liquid droplets thereon to pass over the surface of the bed for a period of time sufficient to insure that the pellets are set to a degree adequate to preclude deformation or mutual adherence. Under most operating conditions it has been determined that the pellets formed meet these requirements if the initial agglomerates are permitted to roll over the surface of the powdered material for a distance of about 25 to about 36 inches. In the production of pelletized fertilizers, a bed of powdered material of at least this length is preferred. Those skilled in the art will experience no difficulty in determining optimum sizes of beds of other types of powdered materials.

The method of the invention may be availed of to produce pellets comprising a single ingredient in which the liquid deposited on the bed of material is an inert substance such as water. Alternatively, the method of the invention may be availed of as a means of simultaneously mixing and pelletizing a combination of materials. When the invention is practiced in this manner, one or more of the desired ingredients are dissolved or dispersed in the liquid medium, which in turn is deposited in droplet form upon the bed of the solid material utilized.

In the production of pelletized fertilizers by the process of the invention water is conventionally employed as the liquid medium. Water soluble fertilizer ingredients which may be availed of include ammonium nitrate, ammonium sulfate, the various ammonium phosphates, sodium nitrate, calcium nitrate, various potassium salts including potassium sulfate, nitrate and chloride; ammonia, sulfuric acid, urea, and others. It will be appreciated that a mixture of powdered or pulverant solid fertilizers or other materials may be utilized to form the bed on which the liquid is deposited.

The following examples are illustrative of the practice of the process of the invention.

Example I

An apparatus of the type represented in the drawings and previously described herein was utilized. Commercial superphosphate fertilizers having particles ranging from microscopic to .05 inch in size was placed in the hopper 7 of the apparatus. The inclined plane 2 was then set in rotation at a rate of about 50 inches per minute. The superphosphate was permitted to flow from the hopper 7 onto the plane 2 and through the cooperative action of the scraper 10 was formed into a sloping bed.

Water was then introduced through the pipe 13 into the annular pipe 11, from which it passed in droplet form through the openings 12 onto the surface of the bed of superphosphate fertilizer. The rate of flow in the pipes 13 and 11 was so controlled that droplets of water of the size requisite to produce pellets having a diameter of about 0.15 inch were produced. Impingement of the water droplets on the upper portion of the sloping bed of superphosphate resulted in the formation of initial agglomerates which rolled downwardly over the surface of the bed, accumulated additional superphosphate and formed the desired pellets. The so-formed pellets which accumulated on pellet retaining means 6 of the apparatus were continuously removed therefrom through the cooperation of the rotating inclined plane and the pellet removing means shown at 14 in the drawing. The so-removed pellets were then transferred to storage by means of a belt-type conveyor as shown in the drawings.

The pellets so produced were characterized by remarkable uniformity of size and density. Furthermore, the pellets were essentially spherical in shape, and were physically strong so that they did not tend to deform or agglomerate.

Example II

The process of Example I is repeated with the exception that the liquid used to form the droplets deposited on the superphosphate bed consists of an aqueous solution of potassium nitrate. In this manner, mixed fertilizer pellets are produced.

It will be obvious from the foregoing that the process of the invention may be practiced in the same manner to produce pellets from all types of finely divided solid materials. Applicant's invention resides generally in a process for producing such pellets, and is not confined to the production of pellets of any particular type of material.

It will be appreciated that in the process of this invention the pellets are not repeatedly tumbled or subjected to the action of the liquid medium. As a consequence, a pelletized product of great uniformity is produced. Furthermore, the process of the invention is economical and simple of operation, and, therefore, constitutes a significant advance in the art.

I claim:

1. A process for pelletizing finely divided solid material which comprises forming a substantially undisturbed body of said material, said body having an exposed inclined surface, depositing in droplet form on an upper portion only of said surface a liquid capable of wetting said material to form initial agglomerates which roll downwardly over said surface and form pellets by the accumulation of an additional quantity of said material, said surface being disturbed only by the impingement of said droplets thereon and the passage of said agglomerates downwardly thereover, the size of said pellets being determined by the size of said droplets, and by the length of said inclined surface.

2. The process of claim 1 wherein said finely divided solid material is a phosphate fertilizer.

3. The process of claim 1 wherein said finely divided solid material is a fertilizer.

4. The process of claim 3 wherein said liquid is water.

5. The process of claim 3 wherein said liquid is water containing fertilizer values.

6. The process of claim 1 wherein said inclined surface is of circular cross-section.

7. The process of claim 6 wherein said body of finely divided material is rotated while said liquid is deposited upon the inclined surface thereof.

8. The process of claim 6 wherein said liquid comprises water.

9. The process of claim 7 wherein said finely divided solid material comprises a fertilizer.

BERNARD J. KERLEY, JR.

REFERENCES CITED

The following references are of record in the file of this patent:

UNITED STATES PATENTS

| Number | Name | Date |
| --- | --- | --- |
| 1,239,221 | Rodman | Sept. 4, 1917 |
| 1,775,313 | Lellep | Sept. 9, 1930 |
| 2,136,793 | Gabeler et al. | Nov. 15, 1938 |